(12) United States Patent
De Vos et al.

(10) Patent No.: US 10,154,672 B1
(45) Date of Patent: Dec. 18, 2018

(54) SCAPULA HARVESTER FOR OPERATING ON A POULTRY CARCASS

(71) Applicant: Meyn Food Processing Technology B.V., Oostzaan (NL)

(72) Inventors: Ferdinand Allard De Vos, Oostzaan (NL); Pieter Willem Vonk, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 16/044,998

(22) Filed: Jul. 25, 2018

(30) Foreign Application Priority Data

Jul. 28, 2017 (NL) ...................................... 2019364

(51) Int. Cl.
*A22C 21/00* (2006.01)
*A22B 5/00* (2006.01)

(52) U.S. Cl.
CPC ........ *A22C 21/0084* (2013.01); *A22B 5/0035* (2013.01); *A22C 21/0023* (2013.01)

(58) Field of Classification Search
CPC . A22C 21/00; A22C 21/0015; A22C 21/0023; A22C 21/003; A22C 21/0038; A22C 21/0046
USPC ........................................................ 452/135
See application file for complete search history.

(56) References Cited

U.S. PATENT DOCUMENTS

| 4,025,001 A | * | 5/1977 | Yarem | A22C 17/04 241/24.16 |
| 4,042,176 A | * | 8/1977 | Beck | A22C 17/04 241/24.16 |
| 4,998,322 A | | 3/1991 | Villemin | |
| 6,280,311 B1 | | 8/2001 | Kuck | |
| 7,922,567 B2 | * | 4/2011 | Gulak | A22C 17/04 452/138 |
| 8,801,508 B2 | * | 8/2014 | Landt | A22C 21/0069 452/135 |
| 9,033,773 B2 | * | 5/2015 | Taniguchi | A22C 17/02 452/135 |

FOREIGN PATENT DOCUMENTS

EP  1591015 A1  11/2005
EP  2826378 A1  1/2015

OTHER PUBLICATIONS

PCT Search Report for application NL 2019364 dated Jul. 28, 2017.

\* cited by examiner

*Primary Examiner* — Richard T Price, Jr.
(74) *Attorney, Agent, or Firm* — Dority & Manning, P.A.

(57) ABSTRACT

Scapula harvester for operating on a poultry carcass including instruments for breaking tissue connections and for harvesting scapula bones that connect to the poultry carcass. The instruments may include back knives and release hooks arranged to operate concertedly such that the back knives cut along and eventually assume a stationary position adjacent to the poultry spine for fixing the poultry carcass in position with the scapula bones directed upwards. The release hooks may execute a down and up movement while the back knives are stationary, wherein during the up movement the release hooks detach the scapula bones from the poultry carcass so as to harvest the scapula.

9 Claims, 11 Drawing Sheets

SCAPULA HARVESTER FOR OPERATING ON A POULTRY CARCASS

PRIORITY STATEMENT

The present application claims priority under 35 U.S.C. § 119 to Dutch Application No. 2019364, filed Jul. 28, 2017.

FIELD OF THE INVENTION

The subject matter relates generally to a scapula harvester for operating on a poultry carcass and, more particularly in certain embodiments, for breaking tissue connections and harvesting scapula bones that connect to the poultry carcass.

BACKGROUND OF THE INVENTION

U.S. Pat. No. 6,280,311 relates to a method for harvesting scapula bones from a turkey carcass, which is fully manually performed.

U.S. Pat. No. 4,998,322 relates to an apparatus for dewinging a bird and includes grippers that can be closed on the wings and transversely displaced apart for tearing the wings from the bird. Such disclosure indicates this procedure can be assisted when the back of the body of the bird has been incised at the base of the coracoids.

EP 1 591 015 indicates a deboning system having a shoulder blade deboning station.

EP 2 826 378 relates to another shoulder blade removal device.

SUMMARY OF THE INVENTION

In one aspect, an exemplary object of the present invention is to provide a method and a scapula harvester that is accurate, reliable, and provides an appealing scapula bone with an appreciable amount of meat attached to it. Accordingly, an exemplary method and an exemplary scapula harvester are proposed in accordance with one or more of the appended claims.

In a first exemplary aspect of the invention, a scapula harvester includes back knives and release hooks that are arranged to operate concertedly. The exemplary scapula harvester is arranged so that during use the back knives cut along and eventually assume a stationary position adjacent to the poultry spine for fixing the poultry carcass in position with the scapula bones directed upwards. The release hooks are arranged to execute during use a down and up movement while the back knives are stationary. During the up movement the release hooks detach the scapula bones from the poultry carcass so as to harvest the scapula bones.

The exemplary release hooks may be provided with an upwardly directed edge which arranges that the scapula harvester automatically adjusts to different poultry carcass sizes, whilst maintaining an accurate and reliable operation with a high yield for each carcass that is processed by the harvester. For this purpose it is further beneficial that the back knives can be spring-loaded so as to at all times closely locate the back knives near to the spine of the poultry carcass.

It is further beneficial that, in certain exemplary embodiments, the harvester includes scraping plates that are operational when the back knives are stationary, and can be arranged to scrape meat from the poultry carcass sideways away from the back knives prior to the release hooks being operational. This avoids that the scapula bones are unintentionally harvested with too much meat which has a higher value when harvested as part of the fillets of the breast.

In an exemplary embodiment, the arrangement wherein the release hooks are provided with a upwardly directed edge can also provide that the scapula bones are always released at a most appropriate position close to the wing knuckles of the poultry carcass, since the edge provides the release hooks with a self-seeking property regarding the location where the scapula bones are desirably released from the carcass.

In another exemplary aspect of the invention, a method is provided for harvesting scapula bones from a poultry carcass employing instruments for breaking tissue connections and for harvesting scapula bones that connect to the poultry carcass. The back knives and release hooks may be arranged to operate concertedly. In this exemplary aspect, the back knives cut along and eventually assume a stationary position adjacent to the poultry spine for fixing the poultry carcass in position with the scapula bones directed upwards. A down and up movement is executed with the release hooks while the back knives are stationary. During the up movement, the release hooks detach the scapula bones from the poultry carcass so as to harvest the scapula bones with meat on it.

In another exemplary aspect, the back knives may be kept closely located near to the spine of the poultry.

In still another exemplary aspect, the scraping plates may be operational when the back knives are stationary. The scraping plates are used for scraping meat from the poultry carcass sideways away from the back knives prior to moving the release hooks upwardly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the figures depicting exemplary embodiments of the method and scapula harvester with limiting the claims that follow.

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
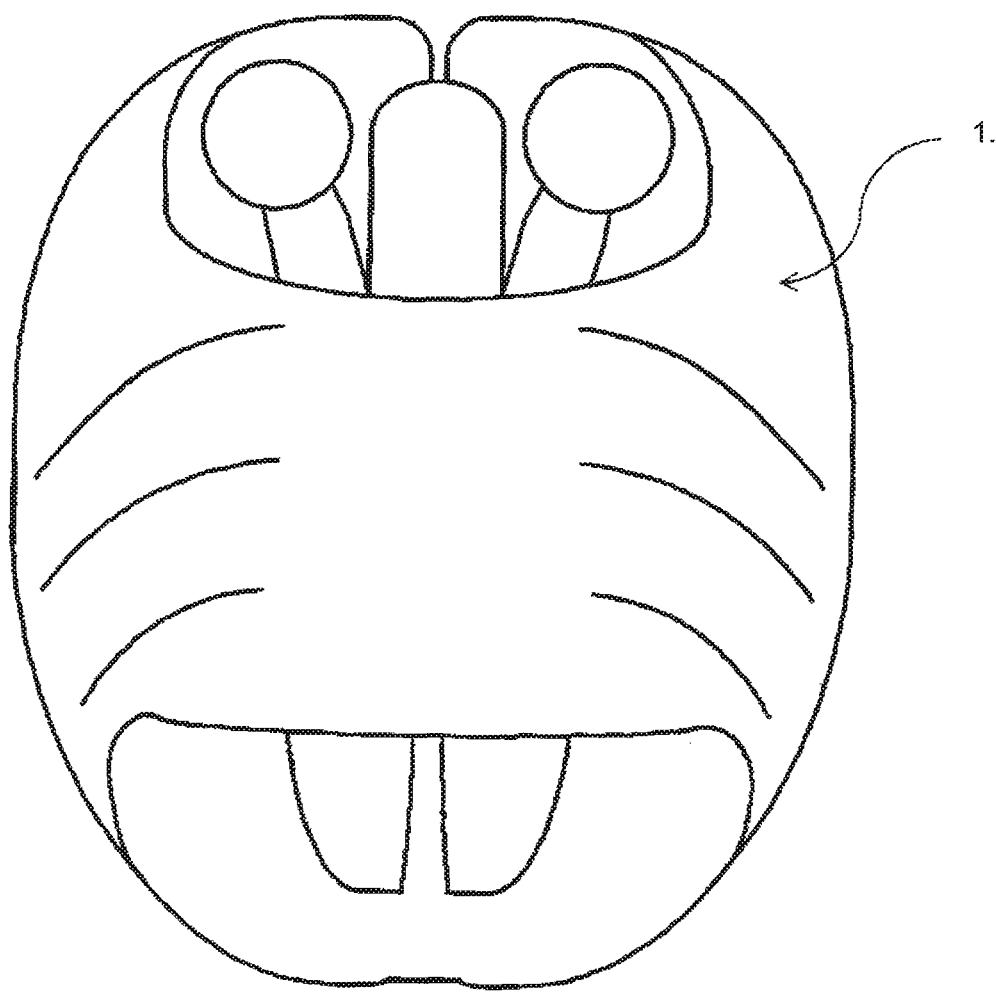
FIGS. 1-11 illustrate exemplary and subsequent stages in executing a harvesting method with a scapula harvester according to exemplary aspects of the invention.

FIG. 1 illustrates a front half 1 as seen from the back. The front half 1 is also shown from the back in FIGS. 3, 4, 6, 7, 9 and 11 together with the exemplary instruments 2, 4, 5 of the scapula harvester of the invention, in which for clarity reasons supporting parts for these instruments are not shown. Specifically, the instruments concern exemplary back knives 2, scraping plates 4, and release hooks 5, and their joint operation will be discussed hereinafter.

FIGS. 2, 5, 8 and 10 show the front half 1 from the side, together with the instruments 2, 4, 5 of the exemplary scapula harvester 10 of the invention, including a supporting construction 11 for the instruments 2, 4, 5 of the scapula harvester 10.

Figure 2:
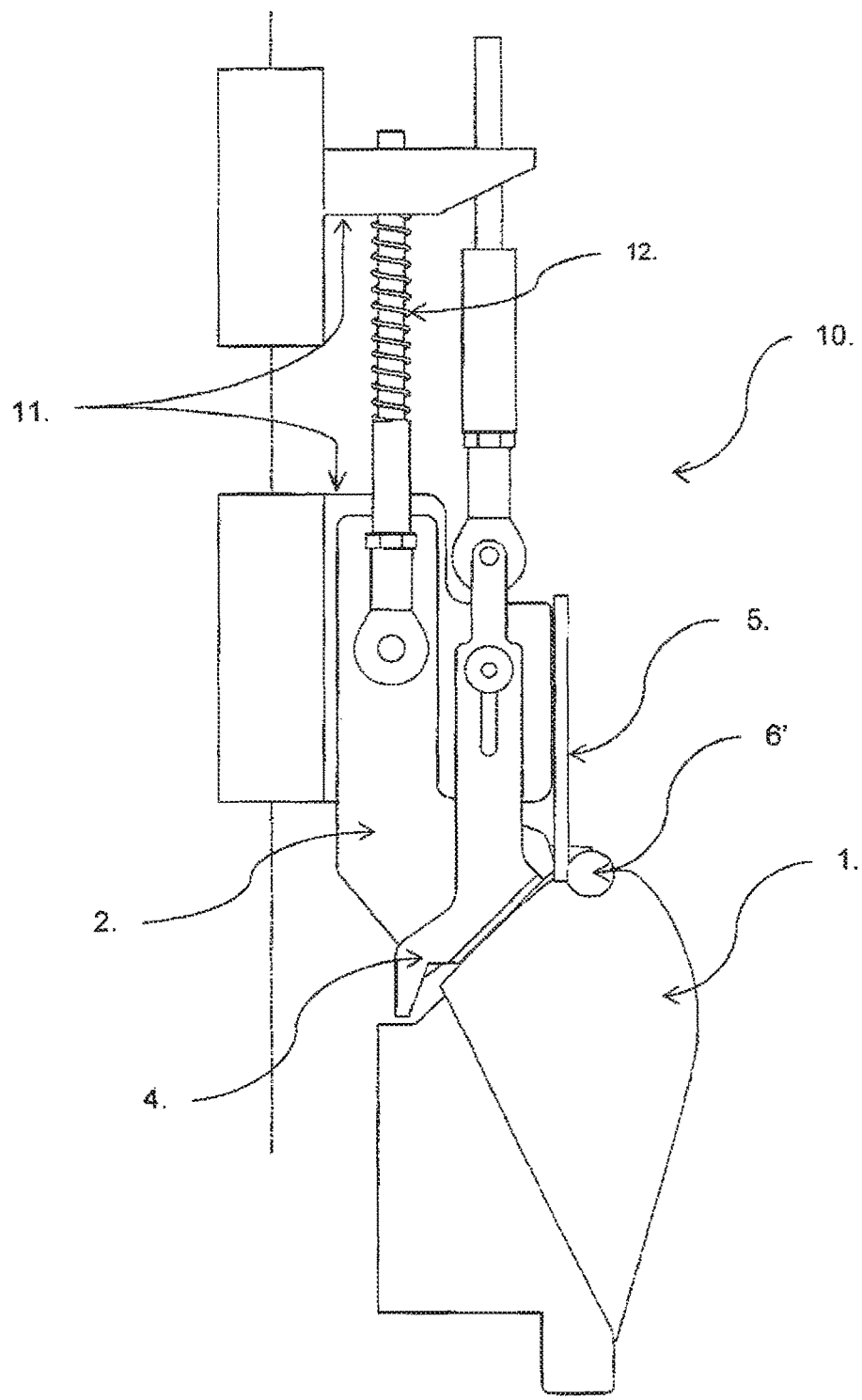

FIG. 2 shows an initial stage of the exemplary scapula harvester 10 of the invention in which the instruments 2, 4 and 5 are not yet operational on the front half 1 and are positioned above it.

Figure 3:
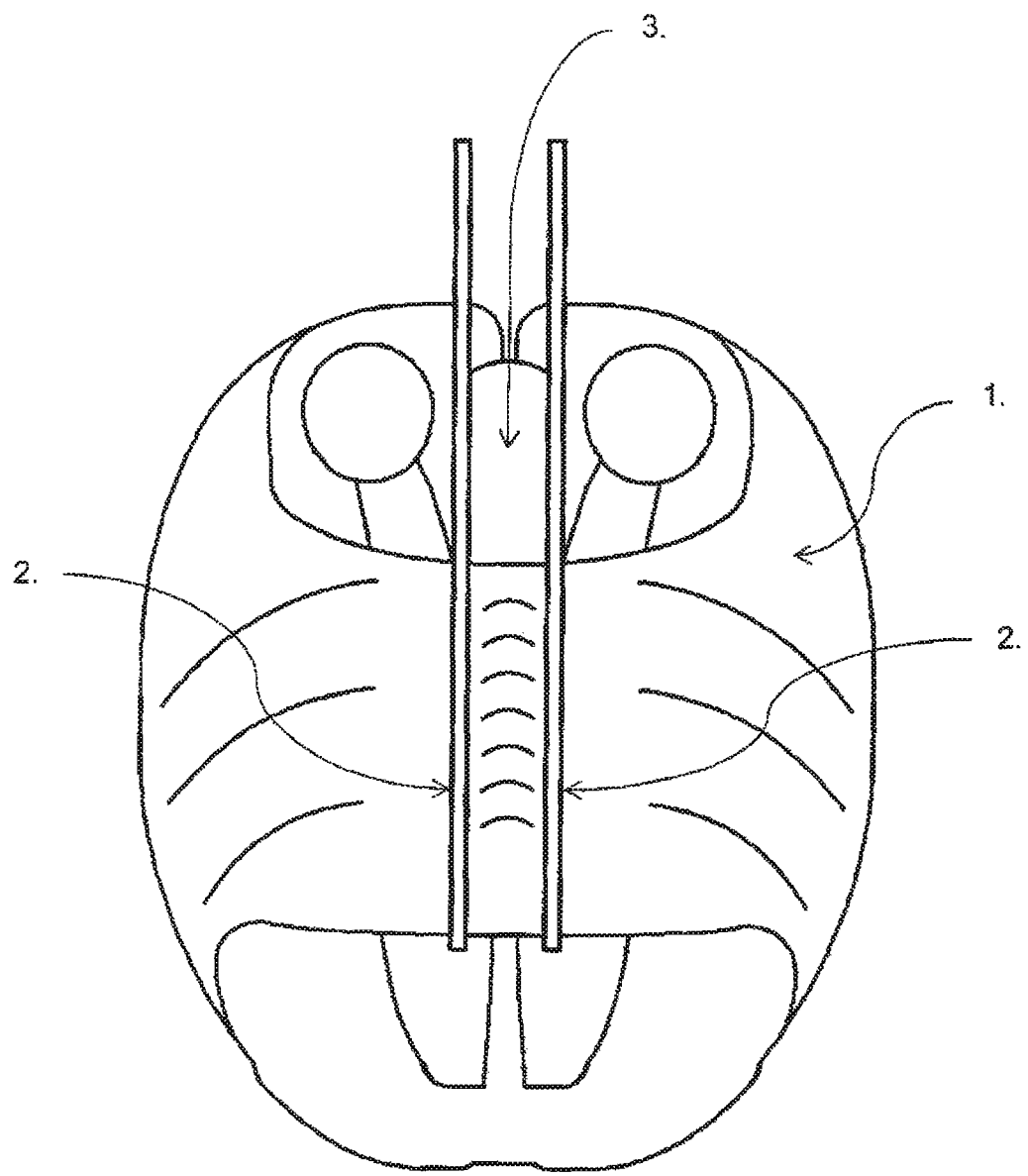

FIG. 3 depicts a first operational position in which the exemplary back knives 2 of the instruments have moved to a stationary position adjacent to a poultry spine 3 of the front half 1. One of the exemplary features of the invention, which is shown in FIGS. 2, 5, 8 and 10, is that the back knives 2 are spring-loaded with a spring 12 to arrange that at all times the back knives 2 are closely located near to the spine 3 of the poultry carcass.

Figure 4:
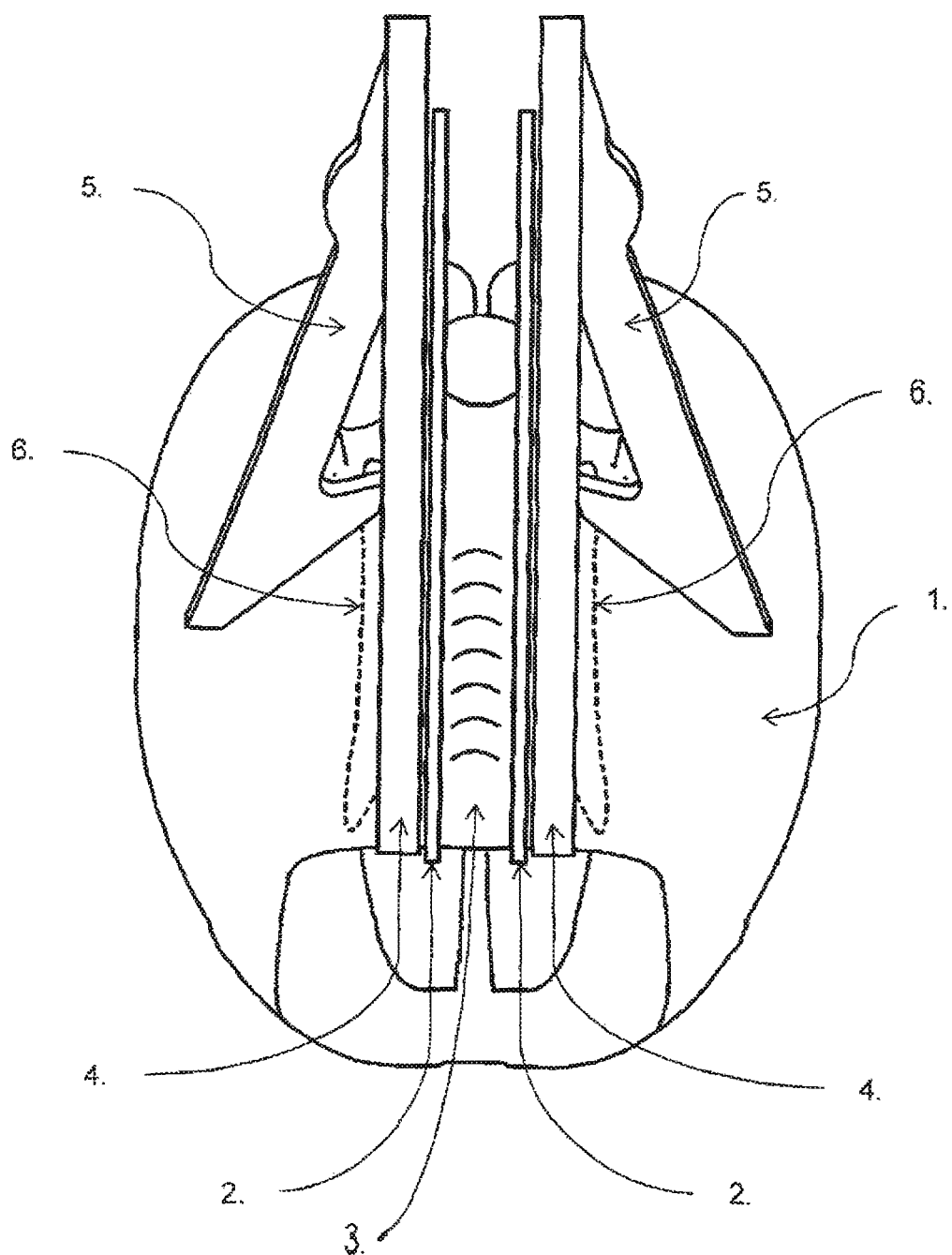
Figure 5:
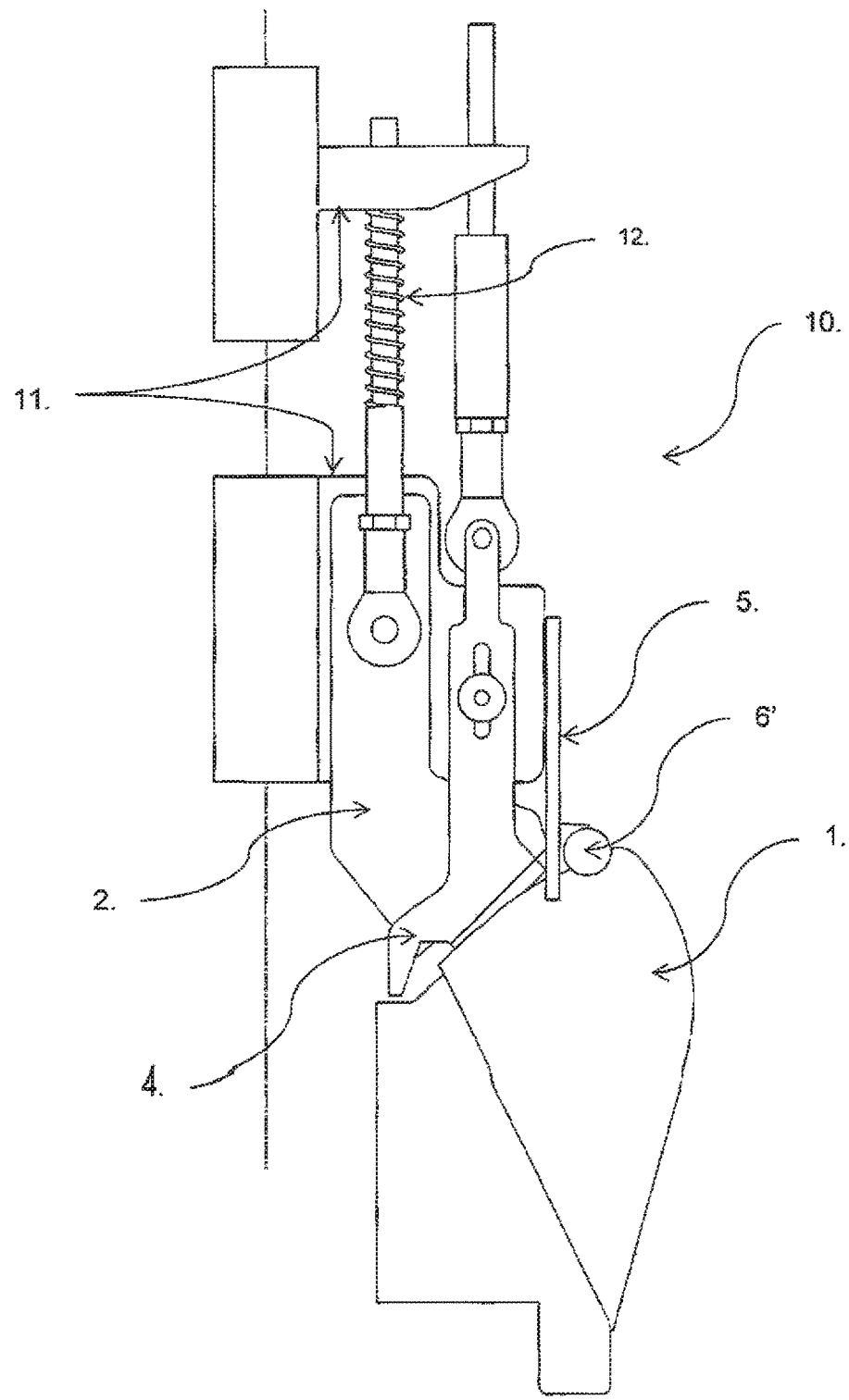

Following the position according to FIG. 3, FIG. 4 shows that exemplary scraping plates 4 have moved next to the back knives 2, and that at an upper region release hooks 5 are moved downward therewith gliding along scapula bones 6 that at a later stage are intended to be released from the poultry carcass. This is also depicted in FIG. 5 showing the front half 1 and the scapula harvester 10 from the side.

Figure 6:
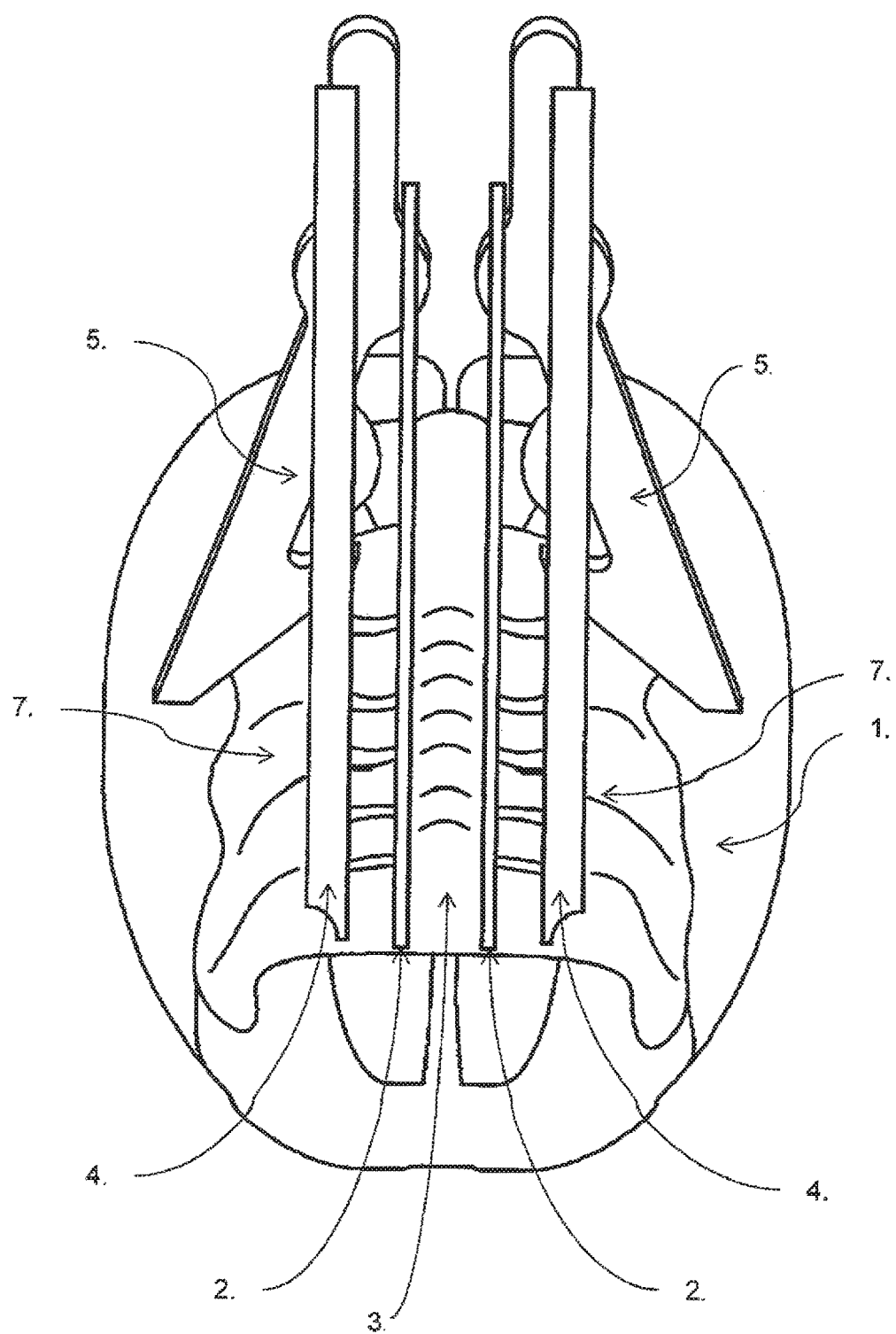

In FIG. 6 it is shown that prior to any upward motion of the release hooks 5, the scraping plates 4 first execute a sideways scraping motion to remove meat 7 away from the spine and the back knives 2.

Figure 7:
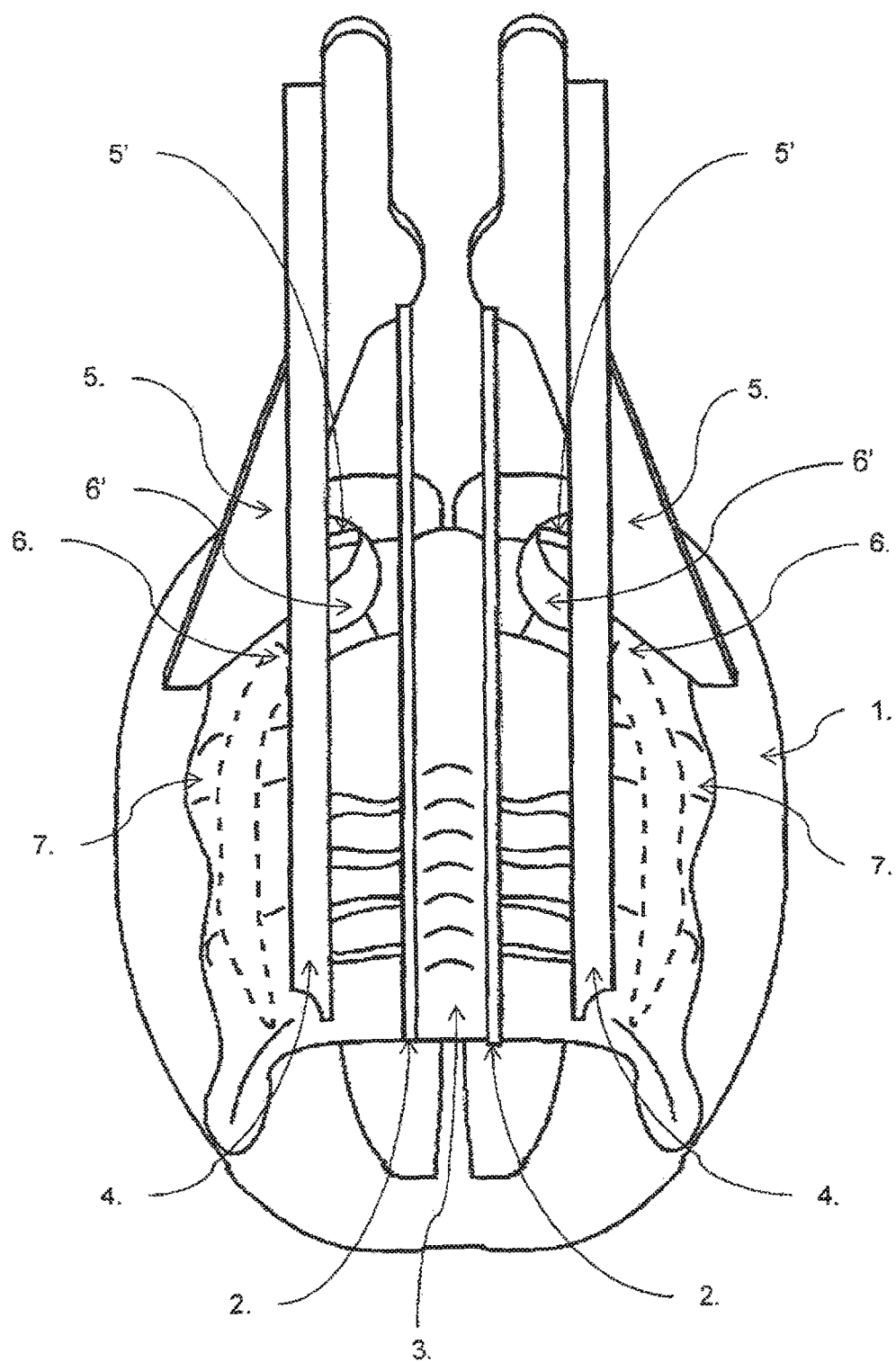
Figure 8:
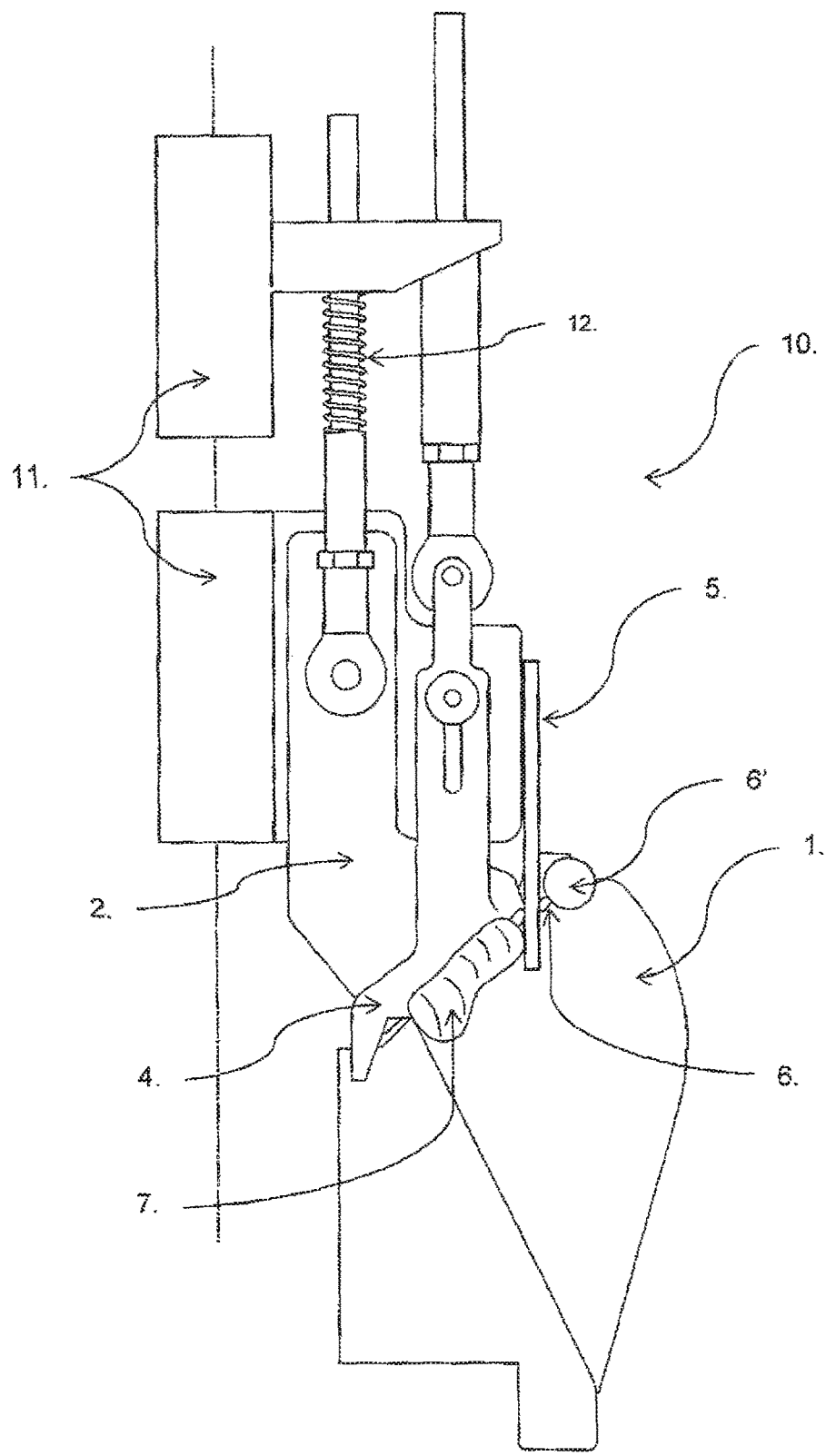

In a subsequent stage as shown in FIG. 7 and FIG. 8 the exemplary release hooks 5 are moved upwards so as to make the scapula bones 6 loose from the front half 1. In order to release the scapula bones at an appropriate position close to the wing knuckles 6' the release hooks 5 are provided with a upwardly directed edge 5' as shown in FIG. 7. This promotes that the edge 5' has a self-seeking property regarding the location where the scapula bones 6 are released from the carcass.

Figure 9:
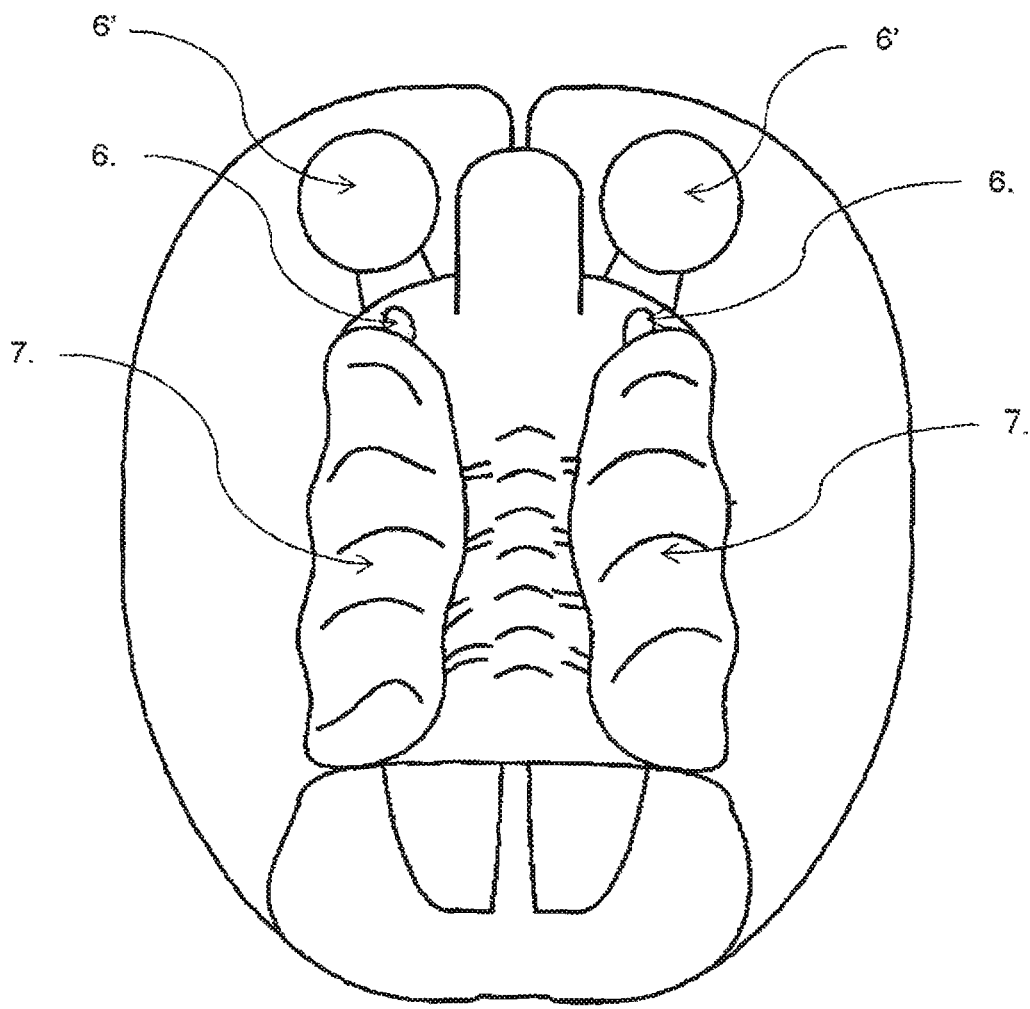
Figure 10:
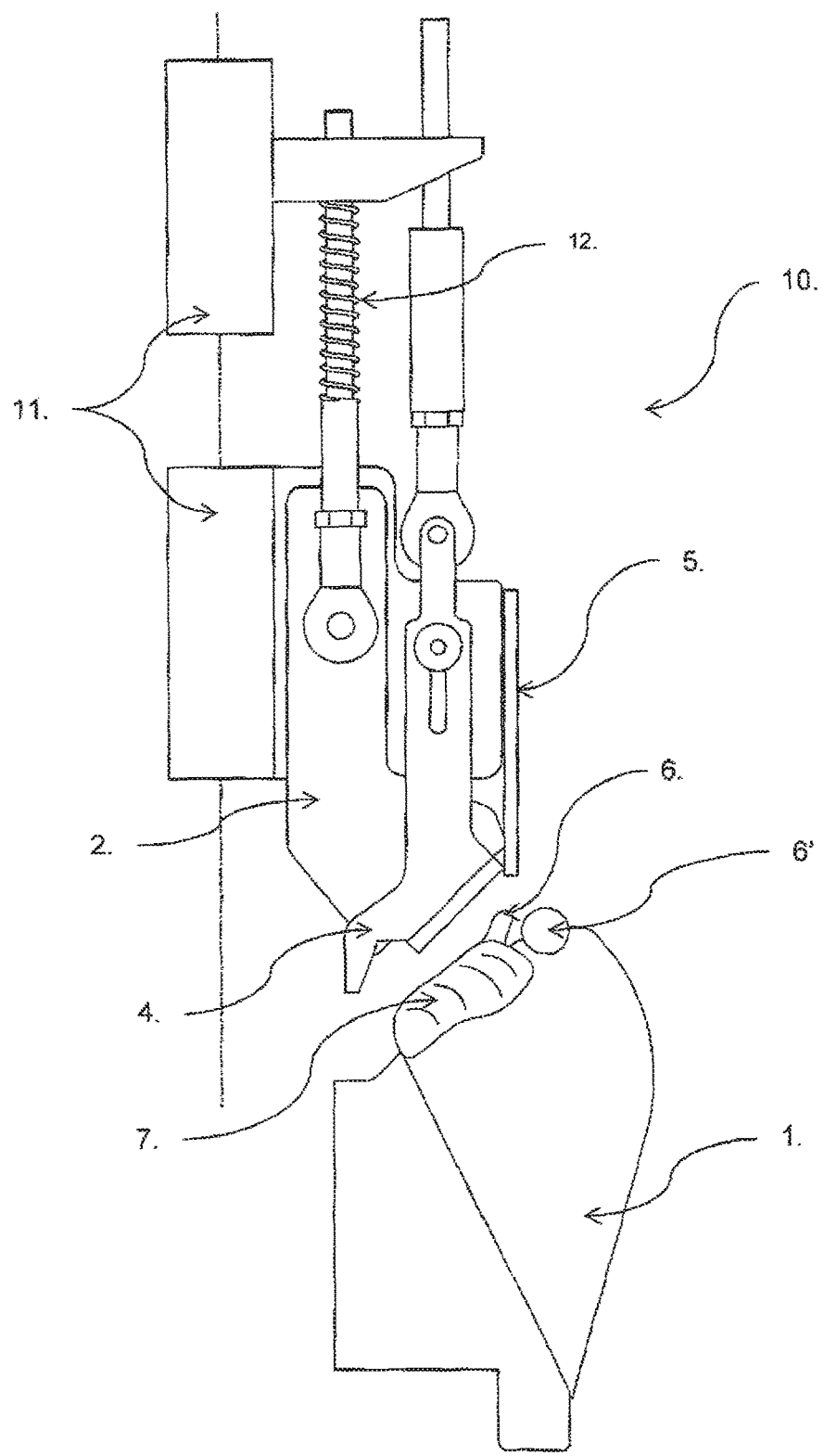
Figure 11:
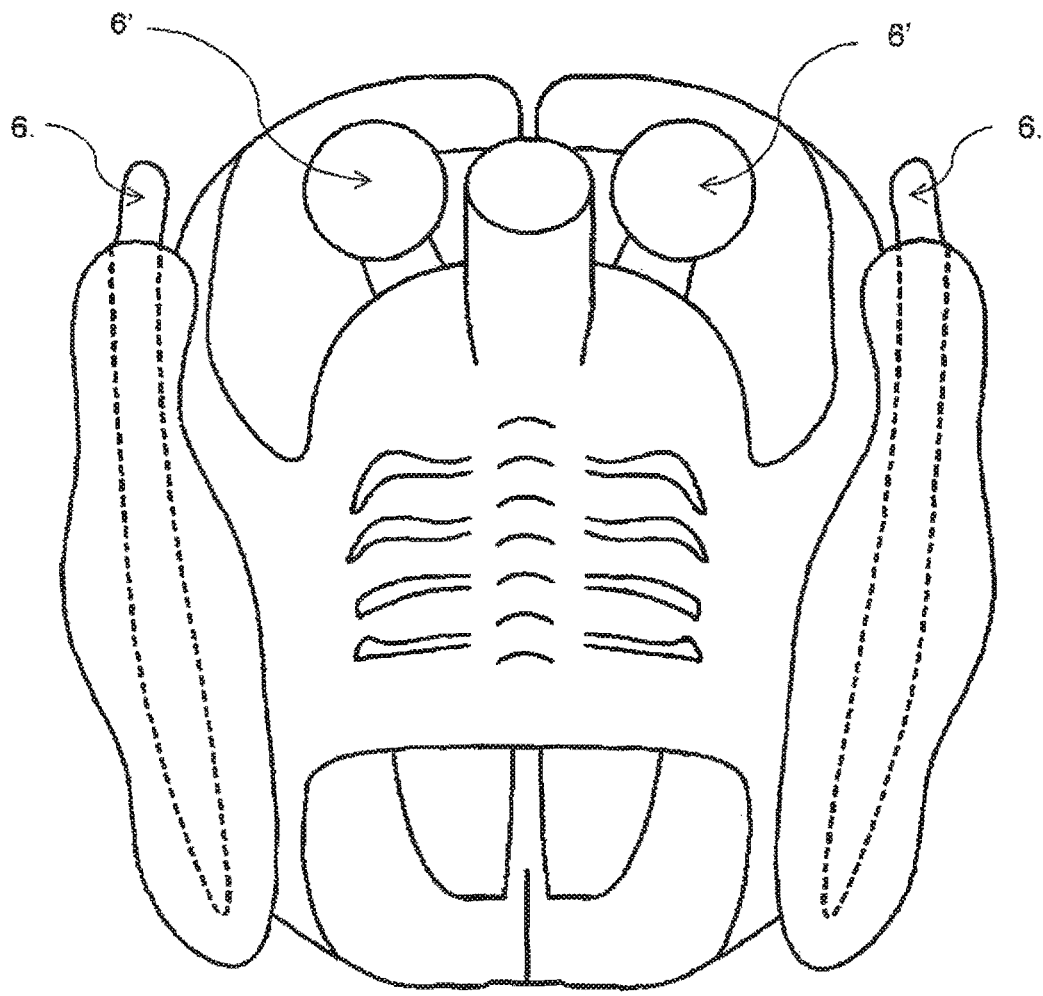

In FIGS. 9 and 10 it is shown that the scapula bones 6 are detached from the wing knuckles 6' and that a slight connection with the front half 1 still exists through tissue connections of the meat 7. These final tissue connections can be detached manually or automatically, resulting eventually in the detached scapula bones 6 with meat on it as shown in FIG. 11.

Although the invention has been discussed in the foregoing with reference to an exemplary embodiment of the method and scapula harvester of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A scapula harvester for operating on a poultry carcass, comprising:
   instruments for breaking tissue connections and for harvesting scapula bones that connect to the poultry carcass, the instruments including
   back knives and release hooks that are arranged to operate concertedly, wherein during use the back knives cut along and eventually assume a stationary position adjacent to the poultry spine for fixing the poultry carcass in position with the scapula bones directed upwards, wherein the release hooks are arranged to execute during use a down and up movement while the back knives are stationary, wherein during the up movement the release hooks detach the scapula bones from the poultry carcass so as to harvest the scapula bones.

2. The scapula harvester as in claim 1, wherein the back knives are spring-loaded with a spring so as to at all times closely locate the back knives near to the spine of the poultry carcass.

3. The scapula harvester as in claim 1, wherein the release hooks are provided with an upwardly directed edge.

4. The scapula harvester as in claim 1, further comprising scraping plates that are operational when the back knives are stationary and are arranged to scrape meat from the poultry carcass sideways away from the back knives prior to the release hooks being operational.

5. A method for harvesting scapula bones from a poultry carcass employing instruments for breaking tissue connections and for harvesting scapula bones that connect to the poultry carcass, comprising:
   providing back knives and release hooks that are arranged to operate concertedly;
   using the back knives to cut along and eventually assume a stationary position adjacent to the poultry spine so as to fix the poultry carcass in position with the scapula bones directed upwards;
   executing a down and up movement with the release hooks while the back knives are stationary; and
   arranging that during the up movement the release hooks detach the scapula bones from the poultry carcass so as to harvest the scapula bones.

6. The method according to claim 5, wherein the back knives are closely located near to the spine of the poultry.

7. The method according to claim 5, wherein the back knives are spring-loaded with a spring.

8. The method according to claim 5, where the release hooks comprise an upwardly directed edge.

9. The method according to claim 5, wherein the scraping plates are operational when the back knives are stationary, and further comprising using the scraping plates for scraping meat from the poultry carcass sideways away from the back knives prior to moving the release hooks upwardly.

* * * * *